US010314243B2

(12) United States Patent
Speer

(10) Patent No.: US 10,314,243 B2
(45) Date of Patent: Jun. 11, 2019

(54) HORTICULTURAL LIGHT MODULE ASSEMBLY

(71) Applicant: Richard Speer, Concord, MA (US)

(72) Inventor: Richard Speer, Concord, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/711,126

(22) Filed: Sep. 21, 2017

(65) Prior Publication Data

US 2019/0082611 A1    Mar. 21, 2019

(51) Int. Cl.
*A01G 7/04*    (2006.01)
*F21V 5/04*    (2006.01)
(Continued)

(52) U.S. Cl.
CPC ............. *A01G 7/045* (2013.01); *F21V 5/04* (2013.01); *F21V 7/041* (2013.01); *F21V 7/22* (2013.01); *F21V 17/002* (2013.01); *F21V 29/77* (2015.01); *G02B 6/0005* (2013.01); *G02B 6/0096* (2013.01); *H05B 33/0857* (2013.01)

(58) Field of Classification Search
CPC ..... G02B 6/0008; G02B 6/0005–6/001; A01G 9/20; A01G 7/045; F21V 2200/00–2200/40
See application file for complete search history.

(56) References Cited

U.S. PATENT DOCUMENTS

2007/0053203 A1*    3/2007  Graham ............... G02B 6/0008
                                                   362/559
2013/0000185 A1*    1/2013  Tanase ................... A01G 7/045
                                                    47/17
(Continued)

FOREIGN PATENT DOCUMENTS

EP    2567610 A2    3/2013
NL    2016151 B1    7/2017
(Continued)

OTHER PUBLICATIONS

Mitchell, Cary, "LEDs for Plant Research and Controlled-Environment Agriculture," 2016 Horticultural Lighting Conference, Oct. 12, 2016, 32 pages.

(Continued)

*Primary Examiner* — Mariceli Santiago
(74) *Attorney, Agent, or Firm* — Yutian Ling

(57) ABSTRACT

Techniques and architecture are disclosed for horticultural lighting systems and devices, such as a light module assembly. The assembly includes a housing with a first and second light module attached thereto. The first and second light modules include a mounting block to be received in the housing. The mounting block includes a plurality of light sources to generate light to stimulate growth of a plant. The first light module includes a first removable lens to focus light from the light sources to a first portion of the plant and in a first direction relative to the plant. The second light module includes an optical conduit attached thereto. The conduit is to focus light from the light sources to a second portion of the plant and in a second direction different from the first direction. The assembly transmits light to an upper portion and a lower portion of the plant.

21 Claims, 4 Drawing Sheets

(51) Int. Cl.
*F21V 7/04* (2006.01)
*F21V 7/22* (2018.01)
*F21V 8/00* (2006.01)
*F21V 17/00* (2006.01)
*F21V 29/77* (2015.01)
*H05B 33/08* (2006.01)

(56) References Cited

U.S. PATENT DOCUMENTS

| | | | | |
|---|---|---|---|---|
| 2013/0021797 A1* | 1/2013 | Kubo | ............ | A01G 7/045 |
| | | | | 362/235 |
| 2013/0100700 A1* | 4/2013 | Kubo | ............ | A01G 7/045 |
| | | | | 362/611 |
| 2016/0235014 A1* | 8/2016 | Donham | ............ | A01G 7/045 |

FOREIGN PATENT DOCUMENTS

| | | | | |
|---|---|---|---|---|
| WO | 9416265 A1 | 7/1994 | | |
| WO | 2010109395 A1 | 9/2010 | | |
| WO | WO-2010109395 A1 * | 9/2010 | ............ | A01G 7/045 |
| WO | 2015042174 A1 | 3/2015 | | |
| WO | WO-2017185047 A1 * | 10/2017 | ............ | A01G 9/26 |

OTHER PUBLICATIONS

"Diffuser (optics)," Wikipedia, available at https://en.wikipedia.org/wiki/Diffuser_(optics), last accessed Sep. 15, 2017.
"Diffuser (optics)," Wikipedia, available at https://en.wikipedia.org/wiki/Grow_light, last accessed Sep. 15, 2017.
Agriculture Lighting, BIOS Lighting, available at http://bioslighting.com/agriculture-lighting/, last accessed Sep. 15, 2017.
"Growroom," Wikipedia, available at https://en.wikipedia.org/wiki/Growroom, last accessed Sep. 15, 2017.
"Irradiance," Wikipedia, available at https://en.wikipedia.org/wiki/Irradiance, last accessed Sep. 15, 2017.
"Lens (optics)," Wikipedia, available at https://en.wikipedia.org/wiki/Lens_(optics), last accessed Sep. 15, 2017.
"Light tube," Wikipedia, available at https://en.wikipedia.org/wiki/Light_tube, last accessed Sep. 15, 2017.
"Optics," Wikipedia, available at https://en.wikipedia.org/wiki/Optics, last accessed Sep. 15, 2017.
Runkle, Erik, "LED Lighting Applications for Plants," Greenhouse Product News Magazine, Oct. 2016, p. 50.
Vermander, Wim, International Search Report and Written Opinion of the International Searching Authority, for counterpart application PCT/US2018/052314, dated Dec. 13, 2018, European Patent Office, Rijswijk, The Netherlands, 11 pages.

* cited by examiner

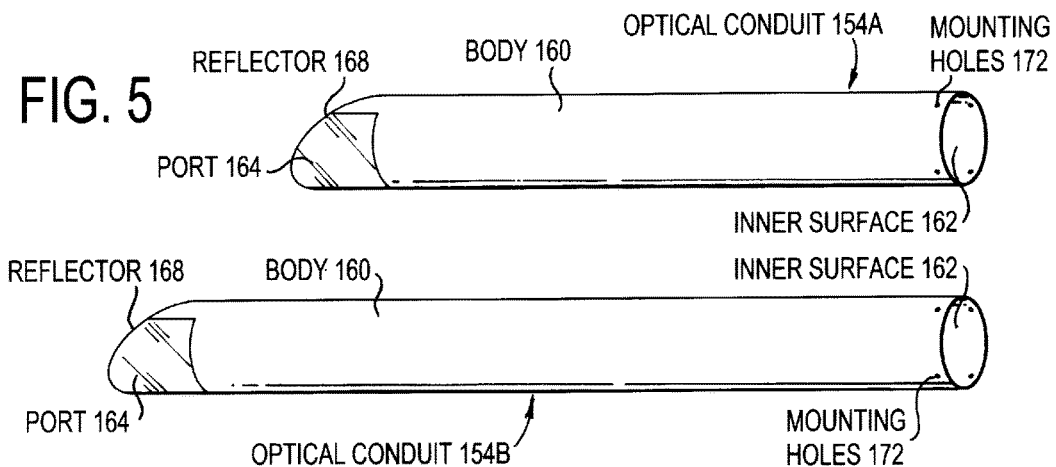
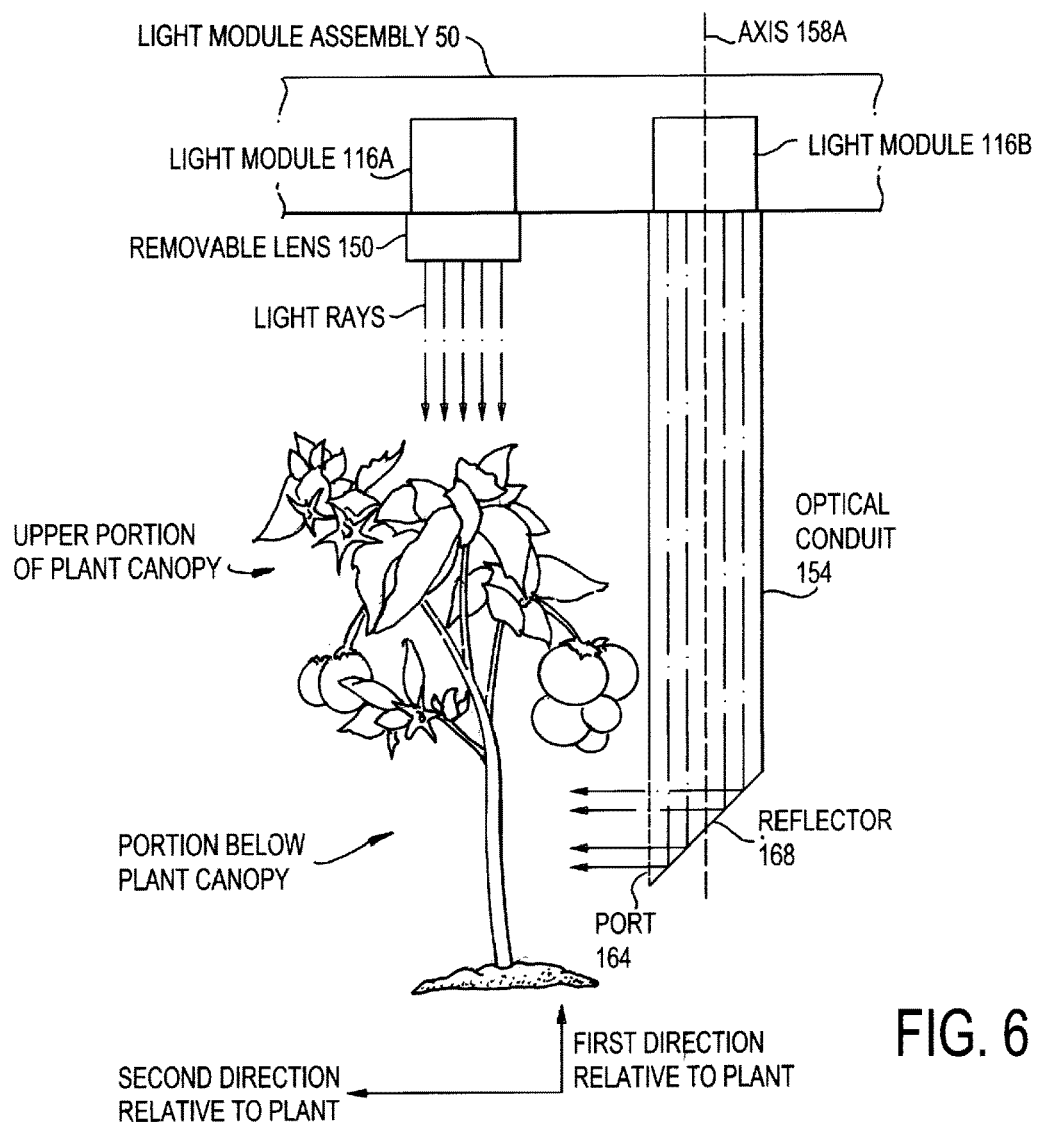

HORTICULTURAL LIGHT MODULE ASSEMBLY

FIELD OF THE DISCLOSURE

This disclosure relates to lighting assemblies, and more particularly to horticultural light module assemblies.

BACKGROUND

Light fixtures, such as grow lights or plant lights, have been used by scientists and commercial growers to grow plants indoors where there is little or no naturally occurring light. An area, such as a grow room, can include a number of grow lights to generate artificial light to stimulate plant growth. The grow lights can be positioned within the area, such that the lights are located above or within a canopy of the plant. Depending on its type, the grow light may more effectively stimulate plant growth during one portion of the life cycle of the plant than another. For instance, grow lights that produce light within the blue spectrum of visible light can promote greater plant growth during a vegetative stage. On the other hand, grow lights that produce light within the red spectrum of visible light can promote greater flowering of the plant during a reproductive stage.

SUMMARY

One example embodiment of the present disclosure provides a lighting device including a housing, a first light module attached to the housing, the first light module including a first mounting block configured to be received in the housing, a first plurality of light sources disposed on the first mounting block and configured to generate light to stimulate growth of a plant, and a removable lens attached to the first mounting block and configured to focus light from the first plurality of light sources to a first portion of the plant, the light transmitted to the first portion of the plant in a first direction relative to the plant, and a second light module attached to the housing, the second light module including a second mounting block configured to be received in the housing, a second plurality of light sources disposed on the mounting block and configured to generate light to stimulate growth of the plant, and an optical conduit attached to the mounting block and configured to focus light from the second plurality of light sources to a second portion of the plant, the light transmitted to the second portion of the plant in a second direction relative to the plant, the second direction different from the first direction.

In some embodiments, the optical conduit includes at least one reflector located therein, the reflector configured to reflect light from the second plurality of light sources in the second direction. In some embodiments, the reflector includes a reflective surface that is positioned at 45 degrees relative to an axis of the optical conduit, such that light is transmitted in the second direction at an angle of 90 degrees relative to the first direction. In some embodiments, light from the optical conduit transmitted in the second direction provides an illumination field, the illumination field includes an angle between 0 and 180 degrees relative to an axis of the optical conduit. In some embodiments, the reflector is a conical-shaped reflector that is configured to transmit light in the second direction that is 90 degrees relative to the first direction to provide an illumination field, the illumination field including an angle of 360 degrees about an axis of the optical conduit. In some embodiments, the optical conduit includes a first reflector located at a first end of the optical conduit opposite a second end the optical conduit, the first reflector facing in the second direction so that light from the light sources is transmitted to a second portion of the plant, and a second reflector located between the first end and the second end of the optical conduit, such that light from the second reflector is transmitted to a third portion of the plant different from the first and second portions of the plant. In some embodiments, the optical conduit is a light tube of one continuous length. In some embodiments, the optical conduit includes two or more sections of tubing releasably attachable to one another for adjusting length of at least one optical pathway. In some embodiments, the optical conduit includes two or more ports, each port configured to transmit light to at least one plant or portion of the at least one plant adjacent to the optical conduit. In some embodiments, the optical conduit is rotatable to transfer light in a plurality of directions. In some embodiments, the optical conduit includes a reflective coating to reflect light from the second plurality of light sources within the optical conduit, in which a first wavelength of light is reflected with a first intensity and a second wavelength of light is reflected at a second intensity different than the first intensity. In some embodiments, one of the first and second wavelengths of light promotes growth one of a stalk, a leaf, a fruit or a flower of the plant. In some embodiments, one of the first and second wavelengths of light is within a range of 380 nanometers (nm) to 730 nm. In some embodiments, the first removable lens is configured to deliver light to the plant at a first irradiance level during a portion of a life cycle of the plant. In some embodiments, the device further including a second removable lens, the second removable lens replacing the first removable lens after the first portion of the life cycle of the plant is complete and configured to focus light to the first portion of the plant with a second irradiance level less than the first irradiance level. In some embodiments, the first direction is a downwardly vertical direction to contact an upper portion of the plant, and the second direction is a horizontal direction such that light from the second light module is received by one of a stalk, a leaf, a fruit and a flower of the plant located beneath the upper portion of the plant. In some embodiments, the device further includes a controller operatively coupled to the first and second light modules and configured to adjust light transmitted from the light sources. In some embodiments, the controller is configured to adjust the first and second light modules individually to allow light of varying wavelengths to be transmitted to different portions of the plant. In some embodiments, the optical conduit includes one or more optical fibers.

Additional implementations of the present disclosure provides a system that includes a controller and a first light module assembly, which includes a housing, a first light module attached to the housing and operatively coupled to the controller, the first light module including a first mounting block configured to be received in the housing, a first plurality of light sources disposed on the first mounting block and configured to generate light to stimulate growth of a plant, and a removable lens attached to the first mounting block and configured to focus light from the first plurality of light sources to a first portion of the plant, the light transmitted to the first portion of the plant in a first direction relative to the plant, and a second light module attached to the housing and operatively coupled to the controller, the second light module including a second mounting block configured to be received in the housing, a second plurality of light sources disposed on the mounting block and configured to generate light to stimulate growth of the plant, and an optical conduit attached to the second mounting block and configured to focus light from the second plurality of light sources to a second portion of the plant, the light transmitted to the second portion of the plant in a second direction relative to the plant, the second direction different from the first direction.

In some embodiments, the controller is configured to independently adjust light from a plurality of light module assemblies including the first light module assembly. In some embodiments, the controller is configured to allow light of varying wavelengths to be transmitted to different portions of the plant.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 5 is a perspective view of optical conduits of the light module assembly shown in FIG. 4, in accordance with an embodiment of the present disclosure.

FIG. 6 is a schematic view of light transmitted from a light module to the plant using an optical conduit of FIG. 5, in accordance with an embodiment of the present disclosure.

Figure 1:
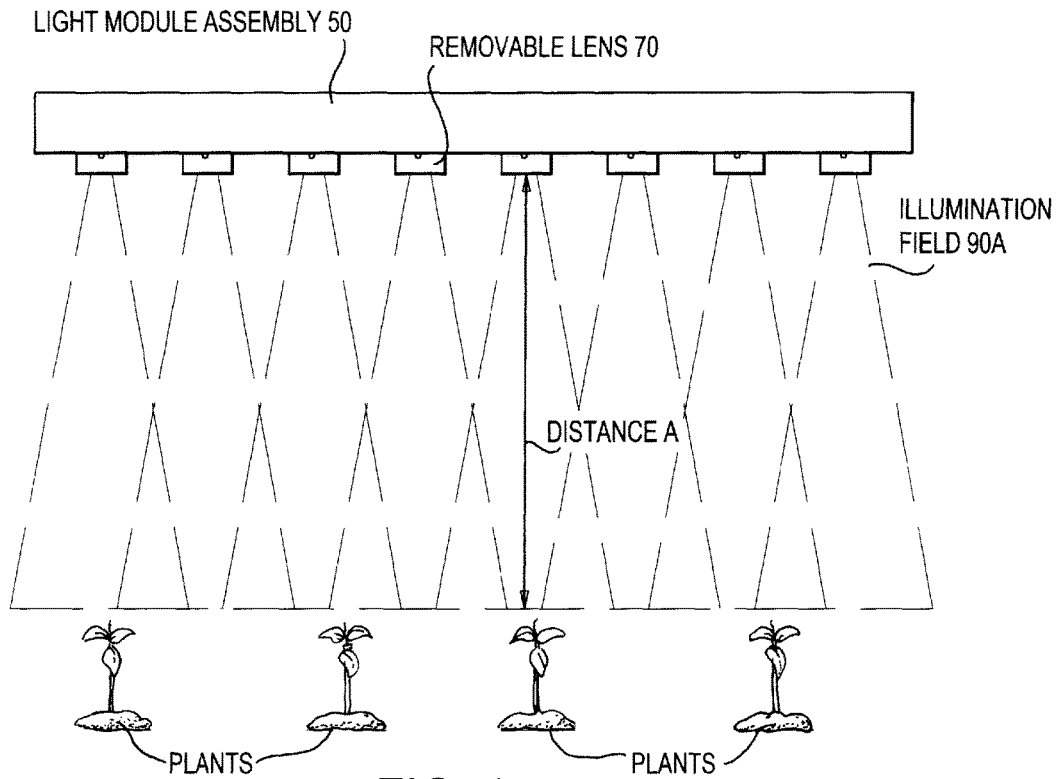
FIG. 1 is a schematic view of a light module assembly configured in accordance with an embodiment of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and architectures are disclosed for horticultural lighting systems and devices, such as a light module assembly. The assembly is readily adjustable by installing removable lenses and optical conduits to provide light to different portions of a plant to stimulate different types of plant growth over the course of the plant's life cycle. In one example embodiment, the assembly includes a housing with a first and a second light module attached thereto. The first and second light modules include a mounting block to be received in the housing. The mounting block includes a plurality of light sources, such as light emitting diodes, that generate light (e.g., red, blue, or green light, or combinations thereof) to stimulate vegetative or reproductive plant growth. The first light module includes a first removable lens to focus light from the light sources to a first portion of a plant, such as an upper portion (i.e., the canopy), and in a first direction relative to the plant, for example in a downward direction and normal to the surface that the plant is disposed thereon (e.g., a ground surface or planting bed). The second light module includes an optical conduit attached thereto that provides intra-canopy lighting to the plant (i.e., within or below the upper leaves forming the canopy). The conduit guides light from the second light module to a second portion of the plant and in a second direction different from the first direction, such as in a horizontal direction relative to the first direction and the main plant stem.

General Overview

Horticultural lighting applications, often used within indoor facilities by commercial growers, often include light fixtures that generate artificial light to stimulate plant growth. These light fixtures, however, may not always efficiently stimulate plant growth throughout the lifecycle of the plant. Furthermore, these light fixtures can be expensive to install. For instance, as plants grow they produce leaves that form a canopy that blocks light from an overhead fixture from reaching lower portions of the plant. Thus, as the plant grows taller and the canopy denser (e.g., more and larger leaves) over time, light from overhead light fixtures no longer adequately illuminates the plant to stimulate growth of the entire plant. Additional light fixtures, such as intra-canopy light fixtures, can be installed within the canopy of the plant to illuminate portions of the plant thereunder. These light fixtures can be expensive to integrate within the existing light infrastructure and also increase the overall cost to grow the plants. Furthermore, the additional light fixtures often times require separate wiring and control systems that are installed separately and independently from existing overhead lighting systems. Sometimes these fixtures can cause damage, such as scorched leaves, fruit, and/or flowers, to plants, and thereby reduce the yield and/or quality of the fruit produced by the plant. Damage can occur to the plants because the intra-canopy light fixtures are positioned too close to the plants, and thus thermal energy emitted from the fixtures inhibits leaf, fruit, flower, and/or stalk growth.

Thus, and in accordance with an embodiment of the present disclosure, techniques and architectures are disclosed for horticultural lighting systems and devices, such as a light module assembly, that are easily adjustable by installing removable optics, such as lenses or optical conduits, onto the assembly. In one example, the assembly includes a first and a second light module within a housing. The light modules include light sources that generate light corresponding to a portion of the visible light spectrum that promotes plant growth (e.g., red, blue or green visible light). The light from the light modules is directed towards different portions of the plant using the removable optics, such that the received light stimulates plant growth. Particularly, the first light module includes a first removable lens that directs the light onto an upper portion of the plant. The second light module includes an optical conduit that guides light from the light module past the upper portion of the plant and delivers the light to portions of the plant, such as flowers, leaves, and fruit, located thereunder. Thus, a single light module assembly can simultaneously provide light to multiple portions of the plant. In addition, by replacing one removable lens with another or replacing a lens with an optical conduit, light can be delivered to a particular portion of the plant (e.g., the plant canopy) at a desired irradiance level to stimulate plant growth. Irradiance is an amount of radiant energy per unit area received by a surface. Note that light with a low irradiance level produces little to no plant growth. On the other hand, light with a high irradiance can damage the plant (e.g., by burning its leaves) and thereby inhibit plant growth. The irradiance level for light received by a plant is dependent on how the light is transmitted by the lens (e.g., a wide or a narrowly focused beam of light) and the distance between the plant and the light source. Generally, a first plant that is located closer to a light source will receive a higher irradiance than a second plant that is further away from the same light source and using the same lens.

Light from the first light module can be adjusted by installing different removable lenses to maintain a constant irradiance level of light received by the plant to promote plant growth throughout a plant's life cycle without adjusting the intensity of light from the light module. The removable lenses are configured to provide light to a plant located within its illumination field at an irradiance level that promotes growth of a plant. The removable lenses focus light from the light sources of the first light module to a first portion of the plant, such as a plant canopy, and in a first direction relative to the plant, for example in a downward direction. However, over a plant's life cycle the distance between the plant and the first light module changes because the plant grows taller above the ground and thereby reduces the distance therebetween. To maintain an equivalent or constant irradiance level of light as the plant grows, without adjusting the intensity of light from the first light module, a first removable lens on the module can be replaced with one or more other removable lenses, such as a second removable lens. The second lens provides light at a particular irradiance level that promotes plant growth for a given distance (or distance range) between the plant and the light module different than a previous distance. In one example, the second lens can be a more diffuse optic that disperses the light into a wider or broader beam of light than the light from the first lens so that the irradiance level of the light received by the plant at the second distance is the same as the irradiance level of light received by the plant at the first distance.

The second light module includes an optical conduit attached thereto. The conduit focuses light from the light sources to a second portion of the plant (e.g., portions located beneath the plant canopy) and in a second direction different from the first direction, such as in a horizontal direction relative to a stalk of the plant. Thermal energy received by the plant from the light module is reduced or eliminated because the light module is located outside and away from the plant. In one example, the optical conduit is a tubular-shaped conduit that includes at least one reflector located therein to reflect light from the second light module in the second direction. The optical conduit can be a single unitary piece or a combination of pieces. In some examples, a conduit can be made up of several pieces or sections that allow a length of the conduit to be adjustable so that light can be transmitted to a desired portion of the plant located a particular distance above the ground. In addition, the optical conduit may include one or more ports that allow light to exit the conduit and be received by the plant adjacent to the conduit. In some examples, the optical conduit can be rotated (e.g., 90, 180, 270 degrees) relative to the light module to position the port in alignment with a portion of the plant adjacent to the conduit. The reflector can include a reflective surface that is positioned at angle, such as 45 degrees, relative to an axis of the optical conduit (e.g., a central axis of the conduit). The reflective surface can transmit incident light in the second direction normal to both the axis of the optical conduit and the first direction. The reflector transmits the light in the second direction to provide an illumination field with an angle between 0 and 180 degrees relative to the axis of the optical conduit. In some other examples, the reflector is a conical-shaped reflector that transmits light in the second direction normal to the first direction to create the illumination field that extends 360 degrees about the axis of the optical conduit.

In accordance with an embodiment of the present disclosure horticultural lighting systems are disclosed. In one example, the system includes at least one light module assembly, as previously described above, and a controller. The controller controls the light generated by each light module assembly by determining an intensity level at which the light is produced. A single light module assembly or a group of assemblies (e.g., four or five assemblies) can be controlled using the controller. In some examples, the light modules within a light module assembly are individually operated by the controller to vary the light produced by each module. In other examples, the light modules are operated collectively using the controller, such that the light module assembly provides a uniform output of light. Numerous such use cases and scenarios will be appreciated in light of this disclosure.

Example Horticultural Light Module Assembly

FIG. 1 is a schematic view of a light module assembly 50 configured in accordance with an embodiment of the present disclosure. Generally speaking, the light module assembly 50 transmits light to stimulate growth of a plant illuminated by the assembly. In particular, the light module assembly 50 is adjustable so that it can provide light to stimulate plant growth over the entire life cycle of a plant and efficiently provide light to a canopy of the plant. The light module assembly 50 can be adjusted by replacing removable lens 70 with one of another lens or an optical conduit to adjust or otherwise change an illumination field 90A, as will be further described herein. In one example, the light module assembly 50 is positioned above plants located within an area, such as a grow room so that light is directed towards the plant in a downward direction.

The light module assembly 50 is configured to provide an illumination field 90A in which a plant located therein receives light to grow. An illumination field is an area beneath the light module, in which light from module is received. As can be seen, the illumination field 90A diverges from the light module assembly 50 along distance A. Particularly, the illumination field 90A includes a first width at the light module assembly 50 and a second width at the plant. In this one example, the illumination field 90A is conical shaped so that the first width located the light module assembly 50 is smaller than the second width at the plant. In addition, the light within the illumination field 90A includes an irradiance value that varies along distance A between the light module assembly 50 and the plant. Irradiance is an amount of radiant energy per unit area received by a surface. As previously described, plant growth is stimulated by light having both a particular wavelength and irradiance level. For purposes of growing plants, light with wavelengths between 380 nanometers (nm) and 730 nm is preferred. Within this range, different wavelengths of light stimulate different types of plant growth (e.g., vegetative or reproductive plant growth). The light modules can be individually or collectively operated to produce different wavelengths of light, as previously described herein. Thus, to stimulate plant growth, the light module assembly 50 generates light at a wavelength that promotes plant growth and focuses light so that the plant receives light at an irradiance level that also promotes plant growth.

During an early portion of their life cycle, plants are seedlings, having a small size and but a few leaves on each and no fruit or flowers thereon and the plant as a whole is stimulated to grow by the light from the light module assembly 50. In one example, the light modules generate light in the green, red, or blue spectrum of visible light to promote vegetative plant growth of the entire plant. The small size of the plants causes distance A between the light module assembly 50 and the plant to be initially large. Since the irradiance value of light of the illumination field 90 varies along distance A, the light assembly module is adjusted to achieve a desired irradiance value of light received at the plant for a given plant height. In particular, the light module assembly 50 is adjusted by installing an appropriate lens (e.g., removable lens 70) to provide light to the plant with a desired irradiance value and at distance A. Also note, that at this time the plant has yet to grow enough leaves to create a leaf canopy (hereinafter referred to as a plant canopy or simply canopy) that blocks light shining down from reaching portions of the plant under the canopy.

Figure 2:
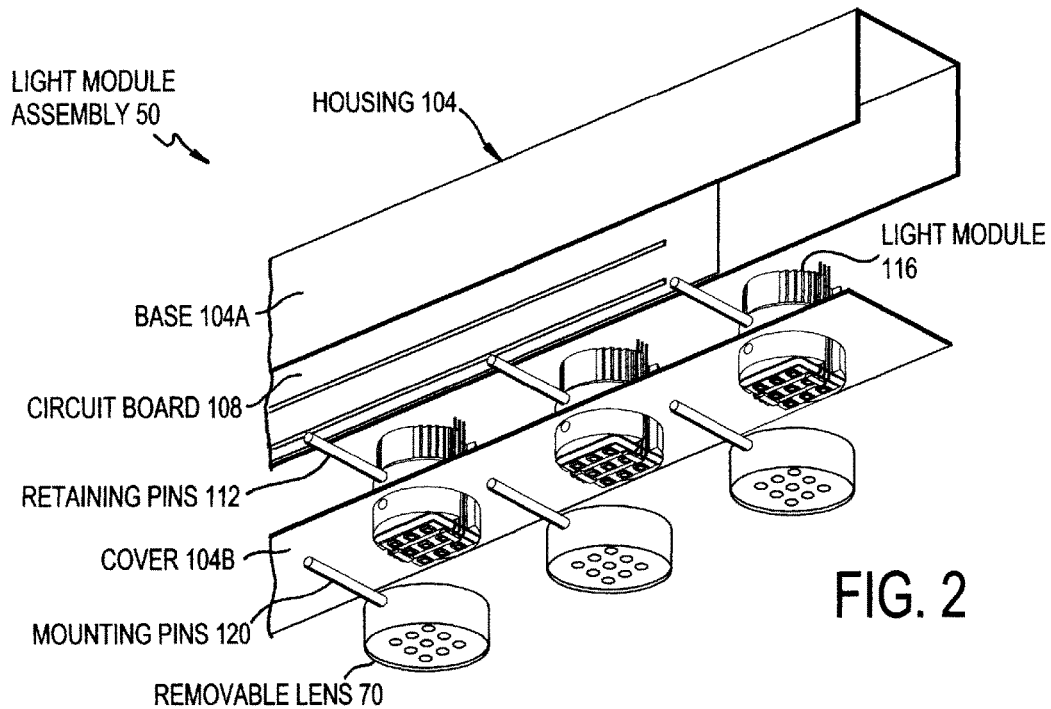
FIG. 2 is an exploded view of the light module assembly shown in FIG. 1, in accordance with an embodiment of the present disclosure.

FIG. 2 is an exploded view of the light module assembly 50 shown in FIG. 1, in accordance with an embodiment of the present disclosure. In one example, the light module assembly 50 includes a housing 104, a circuit board 108, retaining pins 112, a plurality of light modules 116, mounting pins 120, and a plurality of removable lens 70.

The housing 104 is configured to support components of the light module assembly 50. Components such as circuit board 108 and light modules 116, are attached to or positioned within the housing 104. The housing 104 can be attached to or suspended from a structure (e.g., a ceiling or ceiling support) within the area and located above a plant, as shown in FIG. 1. The housing 104 can be made from materials, such as carbon steel and aluminum. In one example, the housing 104 is rectangular in shape and includes a base 104A and a cover 104B.

The housing 104 includes a base 104A in which components of the light module assembly 50 are attached to or disposed within. In one example, the base 104A is a channel that is mounted or suspended within an area. The base 104A is configured to receive the circuit board 108, as shown in FIG. 2, and electrical conductors (e.g., wires) connecting the circuit board 108 with light modules 116. The base 104A is further configured to provide clearance in which to install the light modules 116 onto the cover 104B. When the cover 104B is attached to the base 104A, a portion of the light modules 116 extend into the opening defined by the base 104A. Thus, the base 104A includes a height or depth that is sufficient to allow the cover 104B to be installed thereon without causing damage to components (e.g., the circuit board 108) positioned within the base 104A. The base 104A may further include one or more holes, tabs, clips, snaps, or grooves that are configured to attach or otherwise receive the cover 104B.

The housing 104 further includes a cover 104B that is attached to the base 104A and receives light modules 116. In this one example, the cover 104B is a single piece, such as a sheet or plate of aluminum or carbon steel with a plurality of holes therein to receive the light modules 116. The holes within the cover 104B include a diameter that is larger than a diameter of a light module 116 and can be threaded or non-threaded, depending on the application. The light modules 116 are attached to the cover 104B using retaining pins 112. The retaining pins 112 are installed onto the light modules 116 to prevent the modules 116 from falling out of the cover 104B. In this one example, the retaining pins 112 are ¼ or ⅛ inch round pins having a length larger than the diameter of the light module 116. The retaining pins 112 can be made from materials including, carbon steel or aluminum. The light modules 116 can be attached to the cover 104B in other fashions, such as by threading or fastening the modules 116 thereon (e.g., using a lock nut and washer).

The light module assembly 50 further includes a circuit board 108 that is attached or otherwise affixed to the housing 104 and operatively coupled to the light modules 116. Generally speaking, a circuit board is a device, such as a thin rigid board, that contains an electrical circuit. In one example, the circuit board 108 is a printed circuit board that mechanically supports and electronically connects electronic components, such as the light modules 116, together. The circuit board 108 can include conductive tracks, pads, or etched features made from conductive materials, such as copper or aluminum. The circuit board 108 further includes a non-conductive substrate configured to enable the circuit board 108 to be mounted onto a surface of the housing 104, such as an internal surface of base 104A. Electrical components, such as conductors from the light modules 116, can be attached to circuit board 108, for example by soldering, to operatively couple the light modules 116 to the circuit board 108. Numerous other electrical circuit configurations will be apparent in light of the present disclosure.

The light module assembly 50 also includes removable lenses 70 attached to the light modules 116 using mounting pins 120. The lenses 70 are configured to transmit light from the light modules 116 to provide an illumination field in which a plant located therein can grow. As previously described herein, light received by the plant from the lenses 70 is at a desired irradiance level for a given distance at which the plant is located from the light module assembly 50. In general, a lens is a device that focuses or disperses light passing therethrough. The lenses 70 can be a single lens or a combination of pieces of transparent material. The lenses 70 are attached to the light modules 116 using mounting pins 120. In one example, the mounting pins 120 are installed into both the lens 70 and light module 116 to prevent the lens 70 from falling off of the light assembly module 116. In some examples, the mounting pins 120 are 1/16, ⅛, or ¼ inch round pins having a length substantially equal to or larger than the diameter of the lens 70. The mounting pins 120 can be made from materials including, carbon steel or aluminum. In other examples, the lenses 70 can be attached to the light modules 116 or the housing 104 (e.g., cover 104B) in other fashions, such as by threading or fastening (e.g., using a lock nut and washer). Numerous other lens configurations will be apparent in light of the present disclosure.

Figure 3:
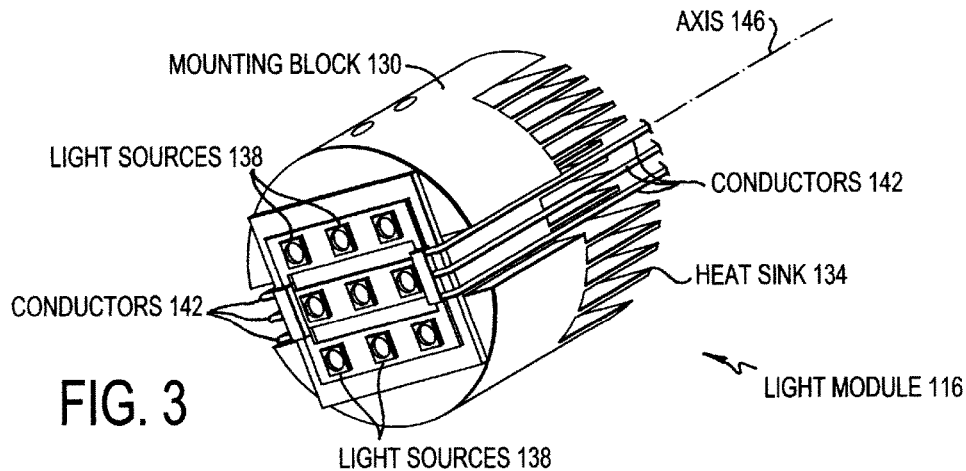
FIG. 3 is a perspective view of a light module of the light module assembly shown in FIG. 2, in accordance with an embodiment of the present disclosure.

FIG. 3 is a perspective view of a light module 116 of the light module assembly 50 shown in FIG. 2, in accordance with an embodiment of the present disclosure. The light module 116 generates light to stimulate plant growth of a plant, as previously described herein. The light modules 116 can be operatively coupled in parallel or series with other light modules 116 and are controllable using a driver and/or control hardware, as will be described further herein. In one example, the light module 116 includes a mounting block 130, a heat sink 134, a plurality of light sources 138, and conductors 142.

The light module 116 includes a mounting block 130 configured to mate with the housing and to receive light sources 138. The mounting block can be manufactured from materials, such as carbon steel or aluminum, that promote a transfer of thermal energy generated by the light sources 138 to the heat sink 134, as will be described further herein. As can be seen, the mounting block 130 can have a form factor, such as a round cylinder configured to be received within an opening of the housing 104. The mounting block 130, in other examples, can include form factors, such as a square, rectangle, oval, hexagon, or octagon.

The light module 116 further includes a heat sink 134 attached to the mounting block 130. Generally speaking, the heat sink 134 is configured to transfer thermal energy from the light sources 138 to the surrounding environment to maintain a temperature of the light module 116. The heat sink 134 can be a plurality of fins that extend from the mounting block 130. As can be seen, in this one embodiment, the heat sink 134 can extend from a rear surface of the mounting block 130 and in a direction parallel to axis 146. In other examples, the heat sink 134 can be positioned along a perimeter of the mounting block 130. Note that no matter its configuration, the heat sink 134 is configured such that the light module 116 can be received within the opening of the housing 104 of the light module assembly 50.

The light module 116 also includes a plurality of light sources 138 disposed on the mounting block 130. The light sources 138 generate light that is guided or otherwise directed to a plant to promote plant growth. In one example, the light sources 138 are three strings of light emitting diodes (LEDs). In general, the light sources 138 may be any type of light emitting device, such as a solid-state emitter or a laser diode. As can be seen, each string can include three light sources 138 that are positioned adjacent to one another along a surface of the mounting block 130. In other examples, the number of light sources 138 within each string may vary from one string to another, depending on a given application. The light sources 138, in yet other examples, may be mixed together so that light sources 138 operatively coupled together are displaced from one another in a non-uniform pattern or arrangement.

Each string (e.g., a group of three LEDs connected together in series) can be configured to produce light having a wavelength corresponding to a different portion of the visual light spectrum. In order for a plant to fully develop and mature so that it yields fruit, the plant receives, over the course of its life cycle, different wavelengths of light that stimulate different forms of plant growth (e.g., vegetative or reproductive growth). For instance, one string can produce light within the red spectrum of visible light, while second and third strings are configured to produce light within the blue and green spectrums, respectively. The red light can be used to facilitate growth of reproductive plant growth whereas the blue and green wavelength can be used to facilitate growth of vegetative plant growth. In this way, a single module can be used (along with other embodiments of the present disclosure) to stimulate plant growth at multiple different stages of the plant life cycle. The light sources 138, in some examples, can be operated within a range between 6 to 10 volts direct current. Attached to the light module 116 are conductors 142, such as insulated copper wires, that transfer electricity from the circuit board 108 to operate the light sources 116.

Figure 4:
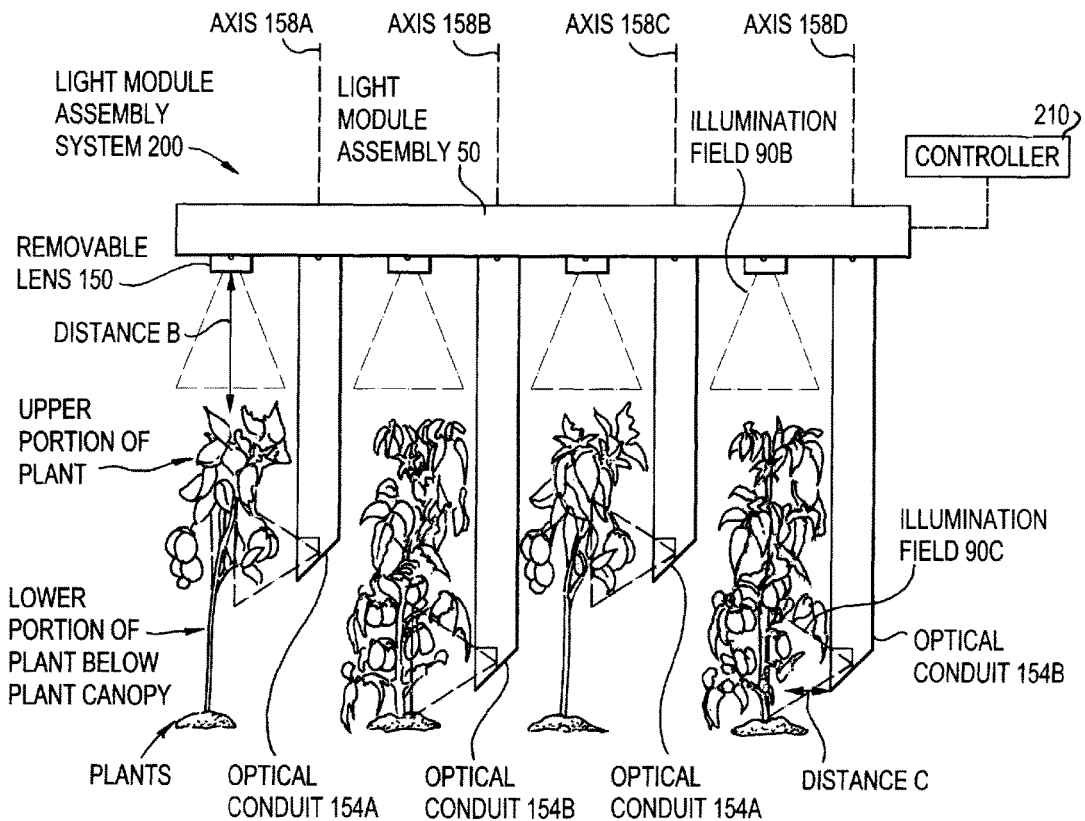
FIG. 4 is a schematic view of a light module assembly system, in accordance with an embodiment of the present disclosure.

FIG. 4 is a schematic diagram of a light module assembly system, in accordance with an embodiment of the present disclosure. The system includes at least one light module assembly 50 and a controller 210. The light module assembly 50 has been previously described in relation to FIGS. 1-3.

The light module assembly system includes a controller 210 operatively coupled to the light module assembly 50 so as to operate the light module assembly 50. In general, the controller 210 determines an intensity level and wavelength at which the light from the light module assembly 50 is produced. In one example, the controller 210 is an electrical circuit or other electronic component, such as a driver, that is operatively coupled to the light module assembly 50 via a wired or wireless network. The controller 210 can operate a single or a plurality of light module assemblies 50, such as groups of four or five assemblies. In some examples, the controller 210 can operate multiple groups of light module assemblies. The controller 210, in some other examples, can be operate light modules 116 of a light module assembly 50 individually to vary light from each light module 116 to provide a different intensity level and/or wavelength of light to plants located beneath the light module assembly 50. In some examples, the controller 210 can operate the light modules 116 collectively together as a group, such that the light module assembly 50 provides a uniform output of light to the plants. Numerous other controller configurations will be apparent in light of the present disclosure.

FIG. 4 also illustrates use of embodiments of the present disclosure to stimulate plant growth at a subsequent stage of a plant's life cycle relative to the seedling stage depicted in FIG. 1. Recall that in FIG. 1, light in the blue or green visible light spectrum was produced to promote growth of the plant itself (i.e., stem and leaf growth) during the seedling stage. Given the low height of the plant in the seedling stage, the irradiance of the plant was based on a distance A.

FIG. 4 illustrates a stage of the plant life cycle in which the plant has grown in size (e.g., the plant is taller and wider as compared to seedlings shown in FIG. 1), and also includes flowers and fruit. Flower and fruit growth are generally recognized to respond to wavelengths of light different from the wavelengths used to promote growth of the plant (i.e., stem and leaf) alone. Also, the increased height of the plant causes the plant to receive light at a different irradiance level because the plant now extends further above the ground. As previously discussed herein, the irradiance level of the light varies as the light moves away from the light module assembly 50. In this example, the plant is now located a distance B (a shorter distance than distance A) from the light module assembly 50. At this distance, the irradiance level of the light received by the plant is different due to the nature of the light produced by the light module assembly 50. The light received by the plant at distance B may not support or otherwise promote plant growth because its irradiance value may be too high to stimulate plant growth. In addition, the plant has also grown leaves that form a canopy on top the plant with fruit and flowers located thereunder. The canopy blocks the light from the light module assembly 50 from contacting the fruit or flower of the plant, and thereby inhibiting the production of fruit.

To solve these problems, techniques of present disclosure provides light module assembly 50 that can be adjusted to transmit light that promotes plant growth to different portions of the plant simultaneously using different optical arrangements. In particular, the light module assembly 50 is adjustable by changing the optical components (e.g., lenses) attached thereto to redirect light in a fashion that provides light to the entire plant as well as light at a proper irradiance level to promote plant growth. In one example, the light module assembly 50 includes removable lenses 150 (hereinafter referred to as lenses 150) and optical conduits 154A and 154B (collectively 154) to direct or otherwise guide light produced by the assembly 50 to different portions of the plant.

The light module assembly 50 includes removable lenses 150 configured to transmit light to stimulate plant growth for a plant located at a distance different than the distance for removable lens 70. The lenses 150 are constructed similar to the lenses 70 previously, described herein, but with different optical characteristics. For instance, lenses 150 provide an illumination field 90B that can be wider and shorter than illumination field 90A produced by lenses 70. As can be seen, the illumination field 90B provides light along a distance B. Lenses 150 are configured to provide light to the top of the plant at an irradiance level that is substantially the same as the level previously received by the top of plant when the plant was a distance A away from the light module assembly 50. Thus, the plant may continue to grow larger in size because the upper portion of the plant is receives light that promotes its growth. Note that the lenses 150 can be attached to the light modules 116 in a similar fashion as done for lenses 70.

The light module assembly 50 also includes optical conduits 154 that direct light from the light module assembly 50 to portions of one or more plants located beneath the plant canopy. Light transmitted by the optical conduits 154 is not blocked by the plant canopy because the light moves past the canopy within a conduit that extends from the light module assembly 50 through or past the plant canopy to deliver light to portions of the plant thereunder. Light generated by the light module assembly 50 is contained within the optical conduit 154 and guided past the plant canopy in a direction (e.g., downward direction) along an axis (e.g., axes 158A, 158B, 158C and 158D, collectively axes 158) to a location in which the light can be transmitted to the plant. In addition, the optical conduits 154 can vary in length depending on a given application. In this one example, optical conduit 154A has a shorter length than optical conduit 154B. No matter its configuration, optical conduits 154 provide an illumination field 90C, in which light is transmitted to portions of the plant below its canopy. As can be seen, the illumination field 90C is transmitted in a direction that is normal to axes 158. The illumination field 90C, in other examples, can be at an angle, such as 10, 30, 45, 60, 75, 110, 120, 140, and 160 degrees, relative to axes 158, depending on the application. Numerous other light module assembly configurations will be apparent in light of the present disclosure.

FIG. 5 is a perspective view of optical conduits 154 of the light module assembly 50 shown in FIG. 4, in accordance with an embodiment of the present disclosure. As described above, the optical conduit 154 guides light from the light module assembly 50 passed the plant canopy and delivers it to a portion of the plant located thereunder. In one example, the optical conduit 154 includes a body 160, a port 164, a reflector 168, and a plurality of mounting holes 172.

The optical conduit 154 includes a body 160 that is configured to transmit light from the light module assembly 50 to a portion of the plant located beneath its canopy. In general, the body 160 is a structure or an enclosure in which the light from the light module assembly 50 is contained within so that it can be redirected to the plant. As can be seen, in this one example, the body 160 is a round tube that is configured to attach to the light module 116 of the light module assembly 50 and to receive light therefrom. When attached, the body 160 guides the light along its length to the plant. The body 160, in other examples, includes a squared, rectangular, or hexagonal shape. As can be seen, the body 160 can be one piece, but in other examples the body 160 can made up of multiple sections. The body 160 further includes an inner surface 162 that reflects light from the light module assembly 50 to guide it along the length of the optical conduit 154. In one example, the inner surface 162 is a highly reflective surface, such as polished aluminum or mirrored surface. The inner surface 162, in some examples, can include a reflective coating that promotes light reflectivity within the body 160. A reflective coating may be preferred in some instances, in which the body 160 is manufactured from materials that provide low light reflectivity. In such instances, the reflective coatings can be selected based on a desired wavelength of light to be propagated to the plant (e.g., wavelengths between 300 nm and 800 nm). In other examples, the inner surface 162 may not be part of the body 160. In such instances, a sleeve can be installed within the body 160 to improve light reflectivity of the optical conduit 154. The sleeve may include an inner surface on which light is reflected along a length of the optical conduit 154. The body 160, in yet other examples, can be an optical fiber, such as a plastic fiber (e.g., an acrylic fiber), configured to guide light from the light module 116 to the plant. In other examples, the body 160 can be a bundle or group of optical fibers (e.g., four or five optical fibers) positioned adjacent to one another. Each of the optical fibers can transmit a portion of the light from the light module to the plant. Individual optical fibers can be positioned independent relative to one another so light can be directed to one or more plants. Alternatively, the bundle of optical fibers can be positioned in groups of two or more fibers so that together the fibers collectively supply light to the plant. Numerous other body configurations will be apparent in light of the present disclosure.

Within the body 160 is a port 164 in which light from the optical conduit 154 moves through to illuminate the plant. Generally speaking, the port 164 is an opening or window within the body 160 to allow light to exit the optical conduit 154. The optical conduit 154 may include one or more ports 164 in which to transmit light to one or more plants located adjacent to the conduit 154. The port 164 can be any size or shape sufficient to provide light that promotes plant growth. In this one example, the body 160 includes one port 164 located at the end of the optical conduit and having a size of 180 degrees about axis 158. In other examples, the port 164 may include a size of 30, 45, 60, 90, 135, and 150 degrees about axis 158. In addition, the body 160 may include multiple ports 164, and each port 164 being a same size or varying in size, depending on a given application. In some such examples, the ports 164 can be located on the opposing surfaces (e.g., located 180 degrees relative to one another), but at different locations along the length of the optical conduit 154 (e.g., one port located at the end and the other in the middle of the conduit). In yet other examples, the ports 164 can be located adjacent to one another (e.g., located 90 degrees relative to one another), but at varying locations within the optical conduit 154. Numerous other port configurations will be apparent in light of the present disclosure.

Located within the port 164 is a reflector 168 configured to redirect light out of the optical conduit 154. In one example, the reflector 168 is a reflective surface positioned within the optical conduit 154 relative to the port 164. The reflector 168, in some examples, can be manufactured from the same material as the body 160. In other examples, the reflector 168 is manufactured from a different material than the body 160 to lower manufacturing costs and/or improve light reflection characteristics of the optical conduit 154. The reflector 168, in this one example, is positioned at an angle, for example 45 degrees, relative to the axis 158 of the optical conduit 154 (e.g., axis 158A for conduit 154). In some other embodiments, the reflector 168 can be positioned at an angle of 10, 15, 30, 60 and 75 degrees, depending on a given application.

Body 160 also includes a plurality of mounting holes 172 that are utilized to attach the optical conduit 154 to the light module 116. The mounting holes 172 also allow the optical conduit 154 to be rotated relative to the light module 116 to reposition the port 164 relative to the plant. In one example, the mounting holes 172 are located at an end of the body 160 that is opposite the end that includes the port 164. As can be seen, in this one example, there are four mounting holes 172 that are positioned orthogonal to one another so that the optical conduit 154 can be rotated in 90 degree increments. In some examples, the number of mounting holes 172 may be more so that the optical conduit 154 can be rotatable in more angular positions relative to the light module 116. The mounting holes 172 have a diameter configured to receive a fastener, such as a screw, bolt or pin. In other examples, the body 160 may not include mounting holes 172, but instead include a plurality of threads to allow the optical conduit 154 to be threaded onto light module assembly 50. Numerous other optical conduit configurations will be apparent in light of the present disclosure.

FIG. 6 is a schematic view of light transmitted from the light module assembly 50 to the plant using an optical conduit 154 of FIG. 5, in accordance with an embodiment of the present disclosure. As can be seen, the light module 116A includes a removable lens 150 that transmits light to an upper portion of the plant in a first direction relative to the plant, for example a downward direction. However, very little of this light is received by the portion of the plant below the plant canopy because leaves of the canopy block light transmission in the downward direction. Thus, the light module assembly 50 is configured to receive optical conduit 154 to deliver light to portions of the plant below the plant canopy. As shown in FIG. 6, the light generated by light module 116B is directed along the optical conduit 154 in a direction along axis 158A (e.g., a downward direction). The light is contained within the optical conduit 154, and directed passed the plant canopy without being blocked by leaves of the plant. Once the light is reflected or otherwise directed to the other end of the optical conduit 154, the light contacts the reflector 168 of the conduit 154. In response, the reflected light is redirected in a second direction relative to the plant (e.g., a direction parallel to the ground surface). The reflected light passes through the port 164 within the optical conduit and is received by the portion of the plant below the plant canopy. The port 164 is sufficiently sized, in this example, to allow the reflected light to be transmitted at an angle 180 degree about to axes 158. In other examples, the angle of the reflected light can be smaller or larger depending on a given configuration of the optical conduit 154. Thus, the light module assembly 50 can simultaneously provide light to both an upper portion (e.g., the plant canopy) and a lower portion of the plant (e.g., the portion beneath the canopy).

Alternative Horticultural Light Module Assembly

Figure 7A:
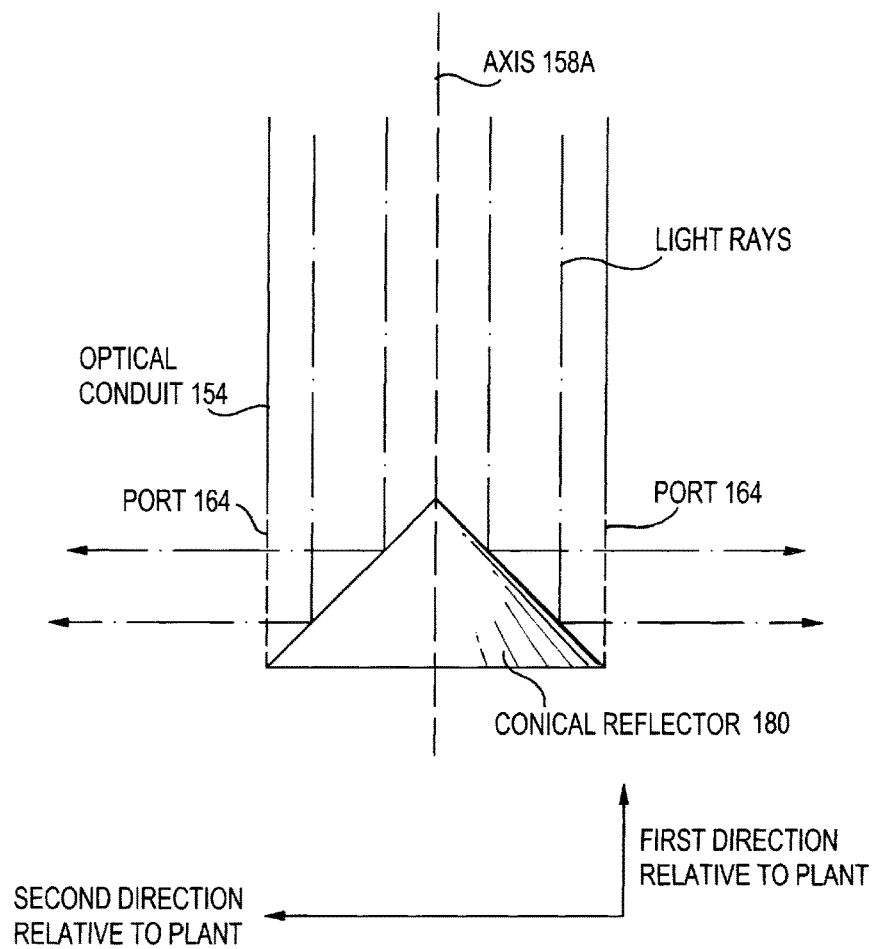
FIG. 7A is a schematic view of an optical conduit that includes a conical-shaped reflector, in accordance with another embodiment of the present disclosure.
Figure 7B:
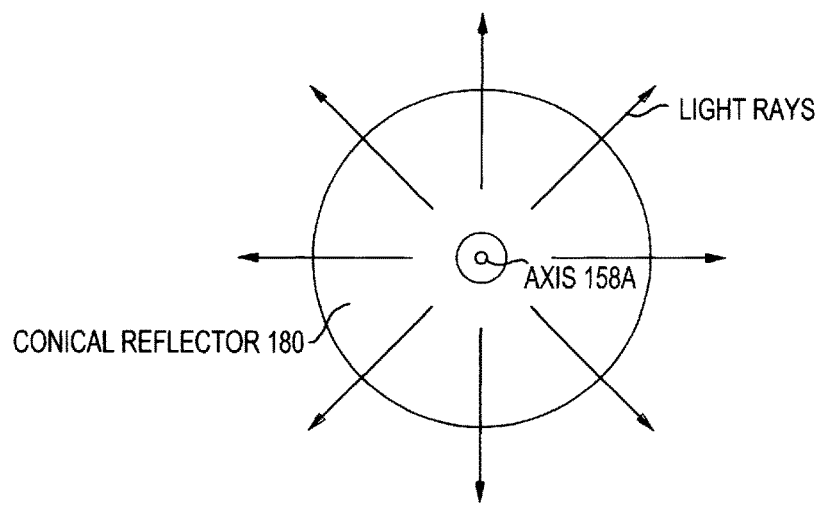
FIG. 7B is a top view of the conical-shaped reflector shown in FIG. 7A, in accordance with an embodiment of the present disclosure.

FIG. 7A is a schematic view of an optical conduit 154A that includes a conical-shaped reflector 180, in accordance with another embodiment of the present disclosure. FIG. 7B is a top view of the conical-shaped shown in FIG. 7A. The optical conduits 154, in some instances, can provide light to more than one plant located adjacent thereto. Such configurations would be advantageous to increase fruit production to a plurality of plants without increasing its size or using additional components (e.g., another light module assembly 50). In one example, the optical conduits 154 include a conical-shaped reflector 180. The conical reflector 180 can be suspended or otherwise attached within the optical conduit 154, such that the port 164 extends 360 degrees around a circumference of the conduit 154. In some other cases, the port 164 is a transparent material that extends an entire circumference of the optical conduit 154 at one end and surrounds the conical-shaped reflector 180. In such cases, the light is reflected from the conical-shaped reflector 180 and through the transparent material of the port 164 to the plant. As shown in FIG. 7A, light travels along the optical conduit 154 in the first direction relative to the plant and parallel to axis 158A and contacts the conical reflector located therein. The reflected light is transmitted in the second direction relative to the plant and about axis 158A. As can be seen in FIG. 7B, the light is transmitted in a 360 degree pattern about axis 158A. Thus, plants located on either side or in front or in back of the optical conduit 154 receive light therefrom to promote growth of portions of the plants located beneath the plant canopy.

In some other embodiments, the irradiance level of light from the optical conduits can be adjusted to promote fruit, flower, and/or stalk growth to portions of the plant under the plant canopy. In one example, the optical conduit includes a lens disposed within the port of the conduit. Generally speaking, the lens can be configured to focus light reflected from the reflector within the optical conduit to portions of the plant located a distance C (as shown in FIG. 4) to stimulate plant growth. The lens can be constructed similar to the lenses 70 and 150, previously described herein, but with different optical characteristics. In some examples, the lens can be integrated into a transparent material that forms the port. In other examples, the lens can be disposed on an outer surface of the optical conduit and over the port. In yet other examples, the lens can be recessed within the optical conduit, such that the lens is between the reflector and the port. In some cases, the lens can focus the light from the optical conduit so that the light from the conduit and removable lenses 70 (or 150) have the same irradiance level. In other cases, the light from the optical conduit and removable lens 70 (or 150) have different irradiance levels. Numerous such use cases will be appreciated in light of this disclosure.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:
1. A lighting device comprising:
a housing;
a first light module attached to the housing, the first light module comprising:
a first mounting block configured to be received in the housing;
a first plurality of light sources disposed on the first mounting block and configured to generate light to stimulate growth of a plant; and
a removable lens attached to the first mounting block and configured to focus light from the first plurality of light sources to a first portion of the plant, the light transmitted to the first portion of the plant in a first direction relative to the plant, and a second light module attached to the housing, the second light module comprising:
 a second mounting block configured to be received in the housing;
 a second plurality of light sources disposed on the mounting block and configured to generate light to stimulate growth of the plant; and
 an optical conduit attached to the mounting block and configured to focus light from the second plurality of light sources to a second portion of the plant, the light transmitted to the second portion of the plant in a second direction relative to the plant, the second direction different from the first direction, wherein the optical conduit includes a reflective coating to reflect light from the second plurality of light sources within the optical conduit, wherein a first wavelength of light is reflected with a first intensity and a second wavelength of light is reflected at a second intensity different than the first intensity.

2. The device of claim 1, wherein the optical conduit includes at least one reflector located therein, the reflector configured to reflect light from the second plurality of light sources in the second direction.

3. The device of claim 2, wherein the reflector includes a reflective surface that is positioned at 45 degrees relative to an axis of the optical conduit, such that light is transmitted in the second direction at an angle of 90 degrees relative to the first direction.

4. The device of claim 3, wherein light from the optical conduit transmitted in the second direction provides an illumination field, the illumination field includes an angle between 0 and 180 degrees relative to an axis of the optical conduit.

5. The device of claim 2, wherein the reflector is a conical-shaped reflector that is configured to transmit light in the second direction that is 90 degrees relative to the first direction to provide an illumination field, the illumination field including an angle of 360 degrees about an axis of the optical conduit.

6. The device of claim 2, wherein the optical conduit includes a first reflector located at a first end of the optical conduit opposite a second end the optical conduit, the first reflector facing in the second direction so that light from the light sources is transmitted to a second portion of the plant, and a second reflector located between the first end and the second end of the optical conduit, such that light from the second reflector is transmitted to a third portion of the plant different from the first and second portions of the plant.

7. The device of claim 1, wherein the optical conduit is a light tube of one continuous length.

8. The device of claim 1, wherein the optical conduit comprises two or more sections of tubing releasably attachable to one another for adjusting length of at least one optical pathway.

9. The device of claim 1, wherein the optical conduit includes two or more ports, each port configured to transmit light to at least one plant or portion of the at least one plant adjacent to the optical conduit.

10. The device of claim 1, wherein the optical conduit is rotatable to transfer light in a plurality of directions.

11. The device of claim 1, wherein one of the first and second wavelengths of light promotes growth one of a stalk, a leaf, a fruit or a flower of the plant.

12. The device of claim 1, wherein one of the first and second wavelengths of light is within a range of 380 nanometers (nm) to 730 nm.

13. The device of claim 1, wherein the first removable lens is configured to deliver light to the plant at a first irradiance level during a portion of a life cycle of the plant.

14. The device of claim 13, further comprising a second removable lens, the second removable lens replacing the first removable lens after the first portion of the life cycle of the plant is complete and configured to focus light to the first portion of the plant with a second irradiance level less than the first irradiance level.

15. The device of claim 1, wherein the first direction is a downwardly vertical direction to contact an upper portion of the plant, and the second direction is a horizontal direction such that light from the second light module is received by one of a stalk, a leaf, a fruit and a flower of the plant located beneath the upper portion of the plant.

16. The device of claim 1 further comprising a controller operatively coupled to the first and second light modules and configured to adjust light transmitted from the light sources.

17. The device of claim 16, wherein the controller is configured to adjust the first and second light modules individually to allow light of varying wavelengths to be transmitted to different portions of the plant.

18. The device of claim 1, wherein the optical conduit comprises one or more optical fibers.

19. A system comprising:
 a controller; and
 a first light module assembly, comprising:
  a housing;
  a first light module attached to the housing and operatively coupled to the controller, the first light module comprising:
   a first mounting block configured to be received in the housing;
   a first plurality of light sources disposed on the first mounting block and configured to generate light to stimulate growth of a plant, and
   a removable lens attached to the first mounting block and configured to focus light from the first plurality of light sources to a first portion of the plant, the light transmitted to the first portion of the plant in a first direction relative to the plant; and
  a second light module attached to the housing and operatively coupled to the controller, the second light module comprising:
   a second mounting block configured to be received in the housing;
   a second plurality of light sources disposed on the mounting block and configured to generate light to stimulate growth of the plant; and
   an optical conduit attached to the second mounting block and configured to focus light from the second plurality of light sources to a second portion of the plant, the light transmitted to the second portion of the plant in a second direction relative to the plant, the second direction different from the first direction, wherein the optical conduit includes a reflective coating to reflect light from the second plurality of light sources within the optical conduit, wherein a first wavelength of light is reflected with a first intensity and a second wavelength of light is reflected at a second intensity different than the first intensity.

20. The system of claim 19, wherein the controller is configured to independently adjust light from a plurality of light module assemblies including the first light module assembly.

21. The system of claim 20, wherein the controller is configured to allow light of varying wavelengths to be transmitted to different portions of the plant.

* * * * *